T. HERBIG.
Stump-Extractors.
No. 141,140. Patented July 22, 1873.
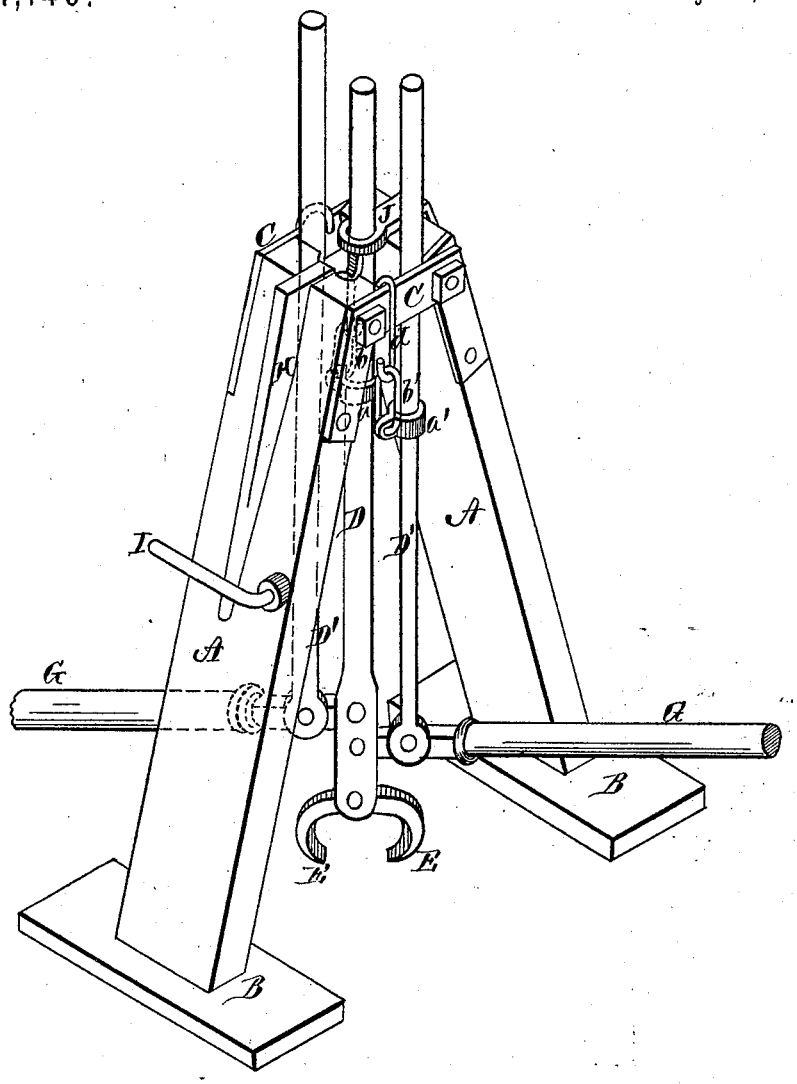

UNITED STATES PATENT OFFICE.

TOBIAS HERBIG, OF JASPER, INDIANA.

IMPROVEMENT IN STUMP-EXTRACTORS.

Specification forming part of Letters Patent No. 141,140, dated July 22, 1873; application filed May 14, 1873.

*To all whom it may concern:*

Be it known that I, TOBIAS HERBIG, of Jasper, in the county of Dubois and in the State of Indiana, have invented certain new and useful Improvements in Stump-Extractor; and do hereby declare that the following is a full, clear, and exact description thereof, reference being had to the accompanying drawings and to the letters of reference marked thereon, making a part of this specification.

The nature of my invention consists in the construction and arrangement of a stump-extractor, as will be hereinafter more fully set forth.

In order to enable others skilled in the art to which my invention appertains to make and use the same, I will now proceed to describe its construction and operation, referring to the annexed drawing, which represents a perspective view of my machine.

A A represent two bars or standards, provided with feet B B, and hinged together at the top by means of bars C C. When the feet stand level on the ground the standards are inclined inward, as shown in the drawing. D represents a center bar, the lower end of which is forked, and has the hooks E E hinged or pivoted in the same. D' D' represent side bars, and G G are the levers for operating the machine. The center bar D passes through a collar, $a$, which is suspended by means of a link, $b$, from the hooked end of a trigger, H, said trigger being pivoted in a slot in the upper end of one of the standards A, and held in proper position by a catch, I. The center bar D then passes through an angular bar, J, attached to the upper end of the other standard A. Each of the side bars D' passes through a collar, $a'$, which is suspended by a link, $b'$, from a hook, $d$, hung upon connecting-bar C. The lower ends of the side bars D' are forked, and in each one is pivoted one of the levers G, the inner ends of said levers being inserted in the forked end of the center bar D above the hooks E E, and there held by pins.

The bars D and D' being lowered, so that the hooks E E will grasp the roots of the stump to be pulled, the levers G G are raised, which causes the bars D' to slip upward in their collars $a'$, then, by pressing down upon the levers, the bars D' will bind in their collars, and the center bar D will be forced upward through its collar, drawing the stump with it. This operation is continued, alternately raising and depressing the levers, until the stump is entirely out of the ground, when the trigger H is released from its catch I, allowing the ring $b$ to drop off from the trigger and the center bar D fall down.

Having thus fully described my invention, what I claim as new, and desire to secure by Letters Patent, is—

1. The frame-pieces A A, hinged together, and having the trigger H and guide J connected to them, as and for the purpose set forth.

2. The bars D D', with their levers and collars, in combination with the frame and the trigger H, as and for the purpose set forth.

In testimony that I claim the foregoing I have hereunto set my hand this 10th day of April, 1873.

TOBIAS HERBIG.

Witnesses:
WILLIAM DUFFNER,
JOHN W. BRITZ.